United States Patent [19]

Rush et al.

[11] 4,180,126

[45] * Dec. 25, 1979

[54] AIR CONDITIONING APPARATUS AND METHOD

[75] Inventors: William F. Rush, Park Ridge; Jaroslav Wurm, North Riverside; Raymond J. Dufour, Wheaton, all of Ill.

[73] Assignee: Gas Developments Corporation, Chicago, Ill.

[*] Notice: The portion of the term of this patent subsequent to Jun. 17, 1992, has been disclaimed.

[21] Appl. No.: 888,740

[22] Filed: Mar. 21, 1978

Related U.S. Application Data

[63] Continuation-in-part of Ser. No. 583,522, Jun. 4, 1975, Pat. No. 4,081,024, which is a continuation-in-part of Ser. No. 415,323, Nov. 13, 1973, Pat. No. 3,889,742.

[51] Int. Cl.² ............................................. F24F 7/00
[52] U.S. Cl. .................................. 165/59; 62/271; 62/2; 62/238
[58] Field of Search .............. 165/7, 59; 62/271, 2, 62/238

[56] References Cited

U.S. PATENT DOCUMENTS

| 3,009,540 | 11/1961 | Munters | 165/7 X |
|---|---|---|---|
| 3,125,157 | 3/1964 | Munters et al. | 165/7 |
| 3,247,679 | 4/1966 | Meckler | 62/271 |
| 3,251,402 | 5/1966 | Glau | 165/7 |
| 3,470,708 | 10/1969 | Weil et al. | 62/271 |
| 3,488,971 | 1/1970 | Meckler | 62/271 X |
| 3,889,742 | 6/1975 | Rush et al. | 165/59 X |
| 4,081,024 | 3/1978 | Rush et al. | 62/271 X |

Primary Examiner—Albert W. Davis, Jr.
Attorney, Agent, or Firm—Thomas W. Speckman

[57] ABSTRACT

Efficiency of an open-cycle air conditioning apparatus and method for heating and cooling is improved and the economy of external power is increased both with respect to cost and energy consumption by providing a combination of a primary heater and a secondary heater for heating the regeneration stream for regenerating the desiccant means in the air conditioning apparatus. The thermal source for the primary heater may utilize waste heat or solar energy which is transferred to a solid phase thermal storage means by a gaseous phase heat exchange medium. The thermal energy may be transferred from the thermal storage means to the regeneration stream of the open-cycle air conditioning apparatus either directly by passing the air stream over the solid phase thermal storage means or indirectly by passing liquid in an enclosed system through the solid phase thermal storage means and the regeneration stream.

11 Claims, 5 Drawing Figures

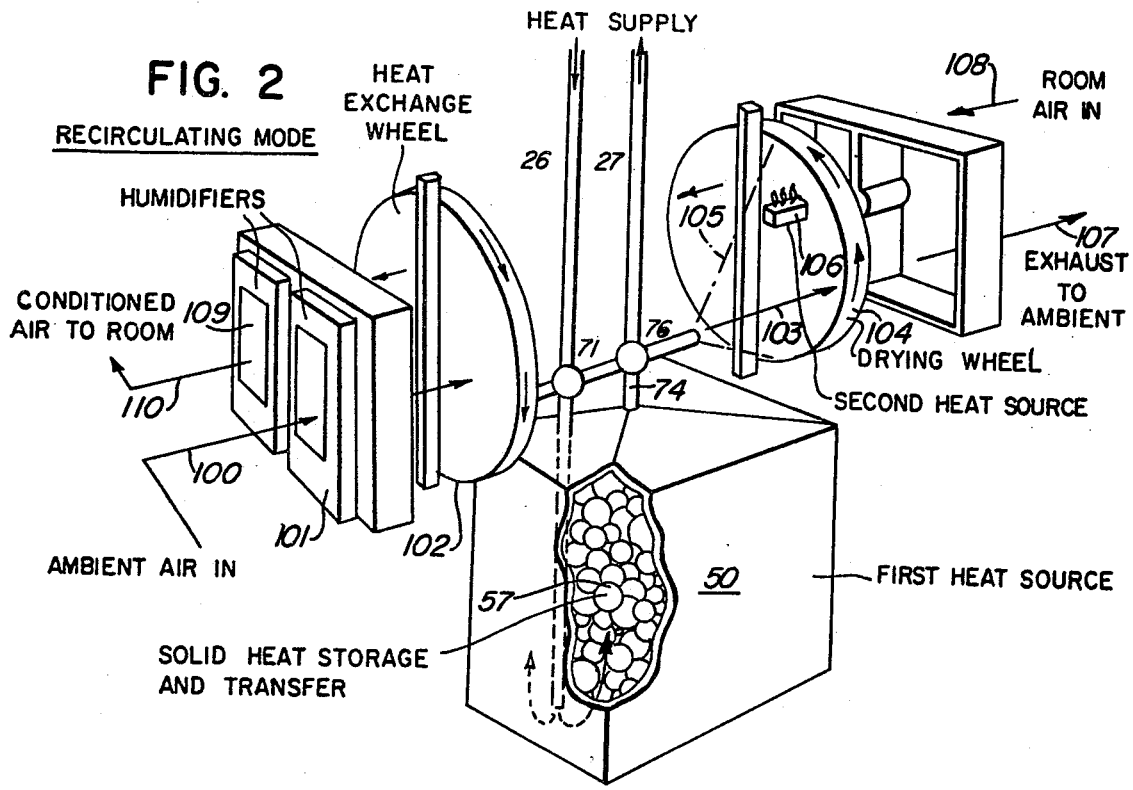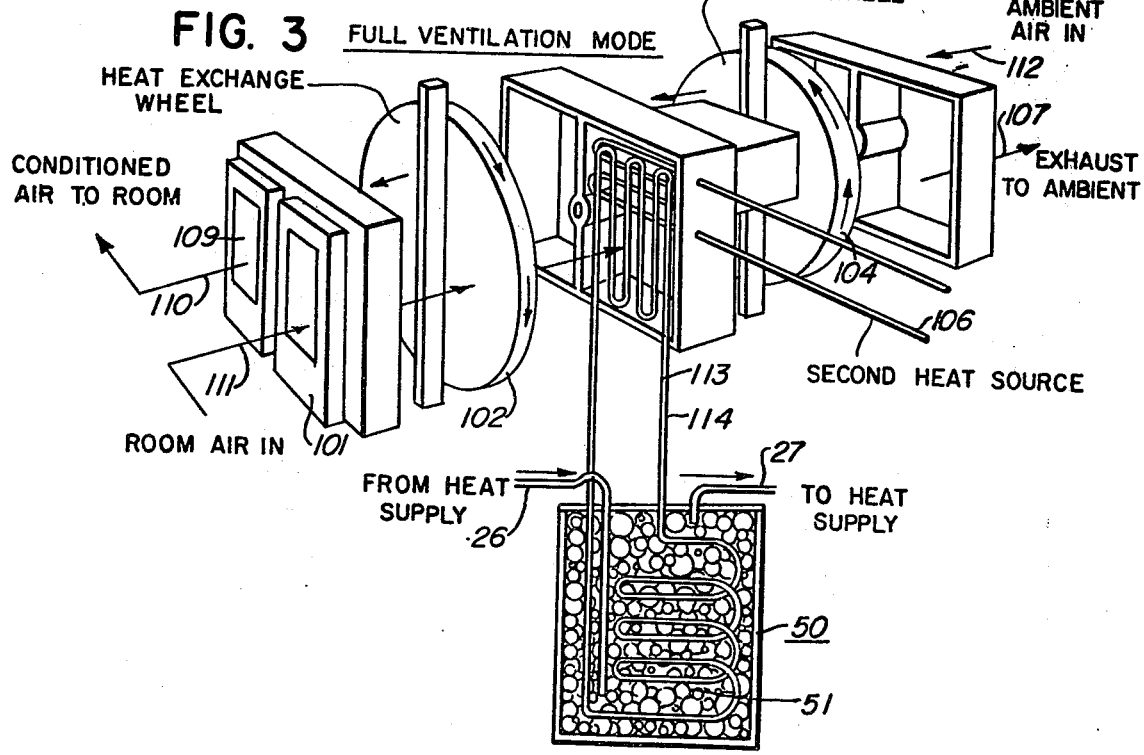

AIR CONDITIONING APPARATUS AND METHOD

CROSS REFERENCE TO RELATED APPLICATIONS

This application is a continuation-in-part of our pending application, Ser. No. 583,522, filed June 4, 1975, now U.S. Pat. No. 4,081,024, which application is a continuation-in-part of our application Ser. No. 415,323, filed Nov. 13, 1973, now U.S. Pat. No. 3,889,742.

This invention relates to air conditioning apparatus and methods of the open-cycle type. More particularly, this invention relates to improvements in air conditioning apparatus and method wherein moisture and heat are transferred from one air stream to another using elements which move cyclically between the air streams.

Air conditioning apparatus of the open-cycle type are generally disclosed in U.S. Pat. No. 2,723,837, Neal A. Pennington and U.S. Pat. No. 2,926,502, C. G. Munters et al, among others. In such apparatus an air stream to be conditioned passes through an air-permeable drying wheel of a hygroscopic material which absorbs moisture from the air substantially adiabatically. The dried air at an elevated temperature then flows through a rotating heat exchange mass whereby it is cooled by removal of sensible heat. The dried and cooled air is then further cooled to the desired temperature and reconstituted to a desired humidity be evaporating water therein. The hygroscopic material of the drying wheel is cyclically regenerated by a regenerative air stream.

During regeneration, the regenerative air stream is first cooled by evaporative cooling and then passed through the heat exchange mass thereby cooling the latter. Thereafter, the regenerative air stream is heated by means of an external heat source to a temperature sufficiently high to regenerate the hygroscopic material of the drying wheel, passed in thermal exchange relation to the hygroscopic material, and then discharged into the atmosphere. Such regeneration means and method are disclosed in U.S. Pat. No. 3,144,901, George W. Meek.

However, utilizing the prior art apparatus a substantial and costly external heat input is necessary for proper completion of the regeneration step. The usual external heat source is an open flame natural gas burner. Especially in view of the fuel conservation it is desirable to minimize external heating requirement and/or to provide means where readily available and relatively inexpensive external energy sources can be advantageously utilized during the operation of this apparatus. This invention relates to the use of waste heat from other processes and solar derived thermal energy to supply all or a portion of the required thermal energy in the regenerative stream of an open-cycle air conditioning apparatus and method.

The use of air as a heat transfer medium from the heat source to the air conditioner in whole or in part, is especially desirable. Recent developments in solar collector technology have indicated that temperatures in excess of 230° F. may be readily obtained in the heat transfer medium. When this heat transfer medium is a liquid, costly additives or pressurized storage systems must be used to prevent vaporization of the liquid. When the heat transfer means between the heat collectors and the storage system is a gaseous phase medium, higher temperature heat transfer mediums present no problem and the installation becomes more trouble free to install and utilize providing compatible apparatus is available to utilize heat supplied by a gaseous phase transfer medium. Such apparatus and method are the objectives of this invention.

Accordingly, it is an object of this invention to provide an apparatus and process for air conditioning including cooling and heating wherein the requirements for a high temperature external heat source are lowered or eliminated.

It is a further object of this invention to provide an improved open-cycle air conditioning apparatus and method whereby a primary heat source utilizing waste heat or solar energy can be utilized to supply a substantial portion of the heat requirement for the regeneration of the hygroscopic material of the moisture transfer means.

It is an object of this invention to provide an apparatus and process wherein the energy from a waste heat or solar source is transferred to the moisture transfer means of the air conditioning apparatus or to a solid phase thermal storage means by a gaseous phase heat exchange medium.

It is still another object of this invention to provide an apparatus and process wherein thermal energy may be transferred from the solid phase thermal storage means directly by passing air in thermal exchange relationship with the storage means or indirectly by passing liquid in an enclosed system through the storage means.

Still other objects within the purview of this invention will readily present themselves to one skilled in the art upon reference to the ensuing specification and the drawings showing preferred embodiments wherein:

FIG. 2 is a schematic representation of an open-cycle air conditioning apparatus showing one embodiment of this invention in a full recirculating mode;

FIG. 3 is a schematic representation of an open-cycle air conditioning apparatus showing one embodiment of this invention in a full ventilation mode;

Figure 1:
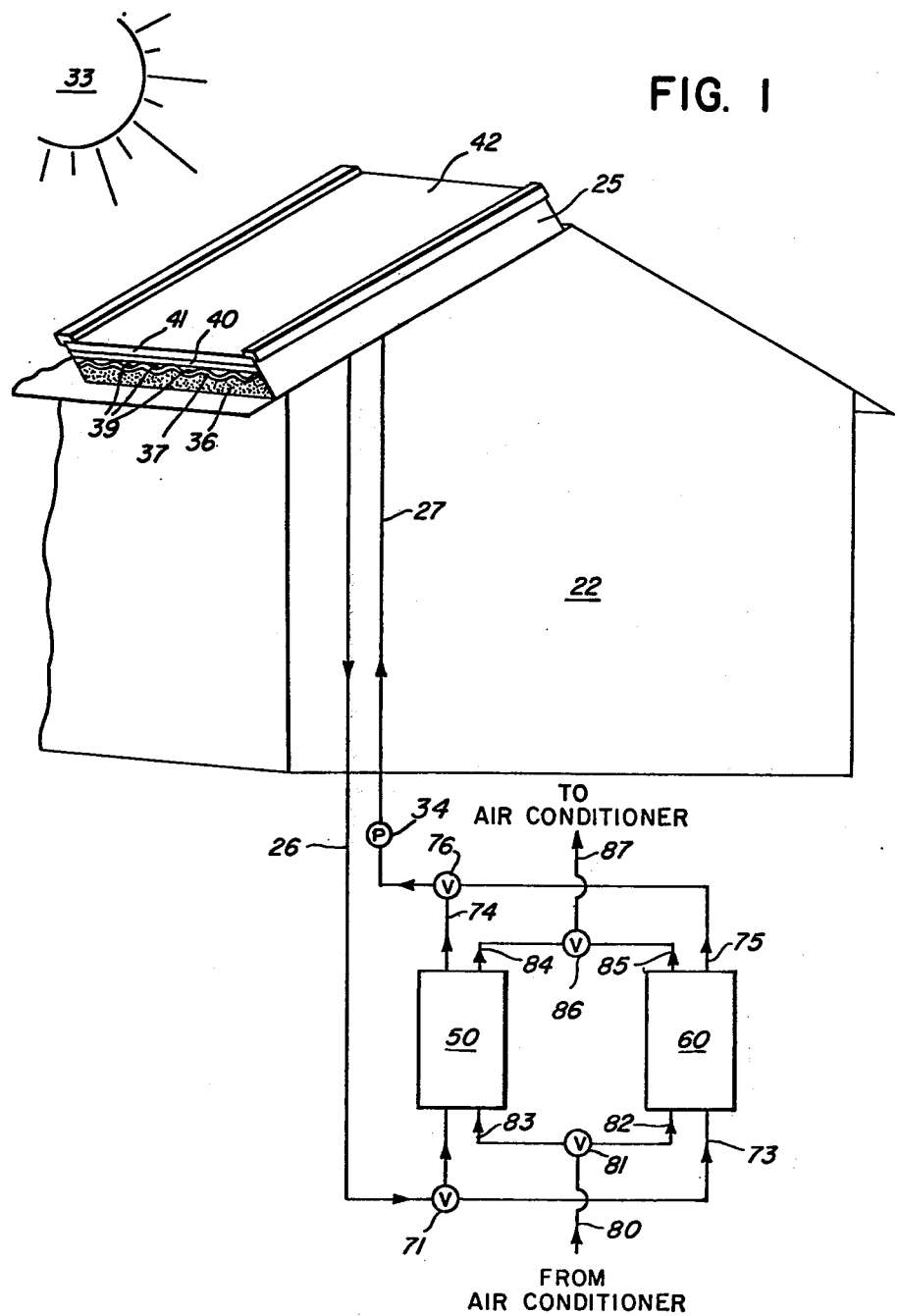
FIG. 1 is a schematic representation showing use of solar heat for an apparatus of one embodiment of this invention.

The present invention is directed to an air conditioning apparatus and process which can be operated both in a cooling mode and in a heating mode. The air conditioning apparatus comprises an enclosure which defines an incoming air passageway for air to be treated and a separate regenerative air passageway, means for passing an air stream through each of these passageways, a sensible heat exchanger means within the enclosure and adapted for transfer of thermal energy from one passageway to the other passageway, and desiccant means for transfer of moisture from the air treatment passageway to the regenerative passageway spaced toward the exhaust to the ambient atmosphere of the regenerative air stream. A first evaporative cooling means is provided near the exit port of the conditioned air passageway to the room and a second evaporative cooling means is provided near the entrance port of the regenerative air passageway for use in the cooling mode.

The improvement of this invention comprises a primary or low-temperature heater means situated in the regenerative air passageway between the sensible heat exchanger means and the desiccant means and capable of supplying heat to an air stream flowing within the regenerative air passageway in an amount frequently sufficient to vaporize moisture carried by the desiccant means into the regenerative air passageway. The heat source for the low-temperature heater means may be waste process or solar heat. Any heat source providing temperatures above the temperature of the air being conditioned after exiting the heat exchange wheel is useful. In the heating mode a heat source above the temperature of the room air is useful. Additionally, a secondary or high-temperatures heater means may be situated in said regenerative air passageway between the primary heater means and the desiccant means which is capable of raising a portion of the heated air stream to a final regeneration temperature for the desiccant when required.

In the cooling mode of the open-cycle air conditioner, four basic steps are involved: (a) drying of a moist air stream to be conditioned by a desiccant means, (b) removal from the conditioning air stream of any residual sensible heat resulting from the drying step, (c) adiabatic saturation of the conditioning air stream with water to provide conditioned air having the desired temperature and humity, and (d) regeneration of the sensible heat exchanger means and desiccant means.

The apparatus and process of this invention may be operated in the full recirculating mode wherein air from a conditioned room passes through the air treatment passageway of the apparatus and returns to the air conditioned room while ambient air from the atmosphere is passed through the regenerative passageway and exhausted to the ambient atmosphere. The apparatus and process of this invention may also be operated in the full ventilation mode wherein ambient air from the atmosphere is conditioned for introduction to the room to be conditioned and exhaust air from the conditioned room is utilized as the regenerative air and exhausted to ambient atmosphere. Combinations of the recirculating and ventilation mode may also be utilized.

For use as a cooling air conditioner, FIG. 2 schematically shows one embodiment of the apparatus of this invention in the full recirculating mode. The regenerative air stream is usually ambient atmospheric air below 120° F. dry bulb and below 95° F. wet bulb. The regenerative air stream 100 enters the apparatus through a humidifier 101 adding moisture to the stream up to the saturation point for the purpose of cooling the incoming air. The moisture saturated regenerative stream is then passed through a heat exchange wheel 102 and heated to about 130° to about 200° F. average, under general cooling air conditioning conditions. The heat exchange wheel rotates in the direction shown at from about 2 to about 12 revolutions per minute, about 5 to about 7 rpm being preferred under general cooling conditions. The full regenerative air stream from the heat exchange wheel is passed directly through the solid phase thermal storage material 51 providing a first heat source which may advantageously be at any temperature above the temperature of the regenerative air stream leaving the heat exchange wheel. Therefore, heat from waste or solar sources is suitable for the first heat source. The solid phase thermal storage material 51 will be more fully described hereinafter. After passage through the first heat source, the regenerative air stream is split into two portions, the first portion 103 passing directly through the drying wheel 104 and the second portion passing through a second heat source 106 prior to passage through the drying wheel 104. The second heat source 106 is at a higher temperature than the first heat source and provides sufficient heat to the second portion of the regenerative stream to regenerate the drying wheel. The final regeneration temperature of the drying wheel is that sufficient to drive off essentially all of the absorbed water of the desiccant on the drying wheel, usually greater than 212° F. and preferably in the order of 212° to 400° F.

The drying wheel 104 rotates in the direction shown at about 1/10 to ½ revolution per minute, preferably about 1/6 to ¼ revolution per minute. The first portion 103 of the regenerative air stream passing through the drying wheel raises the temperature of the desiccant and depending upon its temperature, may drive off adsorbed water, while the second regenerative air stream 105 is of sufficient volume, governed by the angle of exposure of the drying wheel, to regenerate the desiccant at a satisfactory temperature. The regenerative air, after passing through the drying wheel, is usually exhausted to the ambient atmosphere by stream 107.

The air stream to be treated, as shown in FIG. 2, is room air 108, which is adiabatically dried by the drying wheel 104, passes through the heat exchange wheel 102 where a major portion of the sensible heat is removed, followed by adiabatic saturation with water by a humidifier 109 to provide conditioned air stream 110 having desired temperature and humidity.

FIG. 3 shows a preferred embodiment of the apparatus and process of this invention in the full ventilation mode. The apparatus of FIG. 3 is generally the same as that of FIG. 2. In the process shown in FIG. 3, the regenerative cycle input 111 is conditioned room air which, after serving as the regenerative stream, is exhausted to the ambient atmosphere and the input 112 for the air stream to be conditioned is from the ambient atmosphere. The thermal energy is transferred from the thermal storage material 51 to the regeneration stream indirectly by passing liquid 113 in a closed recycle system 114 from the thermal storage 51 to the regenerative stream.

By way of a specific example of use of the cooling apparatus of this invention in a full recirculating mode, as shown in FIG. 2, an air stream 108 from the conditioned room enters the apparatus at 80° F. dry bulb and 67° F. wet bulb (American Refrigeration Institute standard rating conditions), passes through the drying wheel 104 where it is dried to less than about 0.003 pounds of water per pound of air, raising it in temperature to about 148° F. The treatment stream then passes through the heat exchange wheel 102 wherein it is cooled to about 80° F. and is further cooled by evaporative cooling by passing through a humidifying device 109 and exits from the apparatus to the room at about 56.5° F. dry bulb and about 53° F. wet bulb. Countercurrently with the treatment stream passage, regeneration takes place in the regenerative air passageway where a countercurrent stream 100 is taken from the ambient atmosphere, as shown in the regeneration step shown in FIG. 2. All of the air flows are at the rate of 56.1 pounds per minute and the Coefficient of Performance is calculated to be 0.73.

Calculations and FIG. 3 of our parent application, now U.S. Pat. No. 3,889,742, show that for the open-cycle air conditioners operated in the cooling mode prior to this invention, under the above conditions, a reference gas input of 100 cubic feet per hour was selected. Utilizing a first heat source of 230° F., the gas input requirement for the second heat source is reduced to a total gas input (estimated) of 21 cubic feet per hour, almost one-fifth of the former gas input requirement. The first heat source raises the temperature of the preheated sector of the drying wheel to a temperature sufficiently high to accomplish, frequently, a major portion of the regeneration. This reduces the sector of the drying wheel through which the air heated by the second heat source passes. Utilization of the apparatus of this invention under full ventilation mode, as shown in FIG. 3, could reduce the Coefficient of Performance somewhat, dependent upon ambient temperature conditions and room exhaust temperature conditions.

With regard to the construction of the various elements of the air conditioning apparatus embodying the present invention, the drying wheel 104 is preferably a rotating wheel made of a corrugated asbestos sheet and impregnated with a hygroscopic substance such as lithium chloride, silica gel, crystalline aluminosilicates (molecular sieves), and similar substances. The corrugated sheet is then wrapped around a mandrel and wound into wheel shape to form a disc comprising a plurality of parallel channels resulting in high surface area per unit volume which permits rapid drying of an air stream flowing therethrough and regeneration. Typical lithium chloride desiccant wheels are disclosed in U.S. Pat. No. 2,700,537, Neal A. Pennington.

A particularly preferred desiccant wheel, having an amount of desiccant on the support of up to about 90%, comprises sheets or layers of a fibrous material such as asbestos impregnated with about 25 to about 90 percent by weight of finely-divided crystalline alkali metal or alkaline earth metal aluminosilicates having a pore size of about 3 Angstroms to about 13 Angstroms. Asbestos or other fibrous materials may be combined with the aluminosilicates by forming an aqueous slurry of asbestos fibers and the desired amount of an aluminosilicate, depositing the slurry on a continuously moving screen, and then drying the slurry while on the screen so as to form a thin sheet which is rolled to form a wheel in a manner hereinabove set forth. Such aluminosilicate wheels have been found to reduce the moisture of the air stream to less than 0.003 pounds of water per pound of air under the most rigorous conditions of temperature and humidity found in the United States. The use of aluminosilicate wheels is more fully described in U.S. Pat. No. 3,844,737, Desiccant Systems for an Open-Cycle Air Conditioning System.

The heat exchange wheel 102 is preferably a wheel of substantially the same diameter as the desiccant wheel. The heat exchanger wheel can be made of expanded aluminum honeycomb, aluminum foil, fibrous materials such as asbestos coated with hydrophobic material, or the like, which permits the passage of an air stream with very little pressure drop thereacross yet which presents a large heat exchange area.

The evaporative cooling means 101 and 109 may be pads made from cooling tower fill such as corrugated paper sheets impregnated with a suitable bactericide, e.g., phenolic resin. The pads are positioned vertically and water from a reservoir pan situated below the pads is recirculated thereover. As the water runs down the pad by gravity, an air stream passes in a tortuous path through the pad and becomes humidified.

The first heater means may include a heat-exchange coil through which a suitable heat transfer fluid is circulated or the regenerative air may be passed directly over a solid thermal storage material or in thermal exchange with the external heat source itself. The external heat source for raising the thermal storage material to a desired temperature can be solar heat, waste heat from another unrelated operation, heat generated by a nuclear reactor, electrically generated heat, or the like.

The second heater means conveniently can be an open flame burner or it can be a heat exchange coil within which a heat transfer fluid is circulated at a relatively high temperature so that the portion of air stream passing over this heat exchange coil can be heated to the necessary final regeneration temperature.

Not shown in the figures is a suitable fan means to move both the treatment air stream and the regenerative air stream through the apparatus.

Baffle means, preferably adjustable, may be used to conduct the second high temperature portion of the regenerative air stream through the second heat source and to the necessary sector of the drying wheel. The regenerative air stream after thermal exchange with the first heater means may be conducted to the desired sector of the drying wheel and a portion passed in thermal exchange with the second heater means by a manifold means. A portion of the regenerative air stream previously heated by the first heater means may be further heated by the second heater means being located in the portion of the air stream desired to be further heated and the hotter air stream passed through the desired sector of the drying wheel by generally laminar flow of the regenerative air stream as shown in FIG. 2 without any physical baffle.

The present invention is well suited for use in combination with a waste or solar heat source which provides heat input to the first heater means. A particularly preferred air conditioning system embodying the present invention utilizing solar heat is illustrated in FIG. 1. Enclosed space such as home 22 is provided with an open-cycle air conditioner having a gaseous phase regeneration stream in thermal communication with a solid phase thermal storage means heated by solar energy. Two solid phase thermal storage vessels 50 and 60 are shown in FIG. 1. When direct transfer from the solid phase thermal storage means is effected by passing the air conditioner drying wheel regenerative stream in direct thermal exchange with the solid phase thermal storage 51 as shown in FIG. 2, it may be desirable to have multiple thermal storage vessels so that a continuous regeneration stream is available by cycling regardless of temperature or desired flow through the heat source. In such a mode of operation, the regenerative stream after passing the heat exchange wheel 102, is shown entering the thermal storage means by conduit 80. Valve 81 directs the stream to heat storage vessel 50 or 60 by conduit 83 or 82, respectively. The regenerative stream passes in direct thermal exchange relation with the solid phase thermal storage material 51 which has been previously heated by passage of a gaseous phase heat exchange medium in cycled thermal exchange relation between solar collector means 25 and the solid phase thermal storage material 51. The regenerative stream passes from the heat storage vessel 50 or 60 by conduits 84 and 85, respectively, controlled by valve 86, through conduit 87 and at least a portion of which is passed to a second higher temperature heat source 106, if necessary, as more fully described above, to the drying wheel 104 of the air conditioner. Any suitable number of heat storage vessels with suitable valving may be utilized to obtain the desired temperature of a continuous flow regenerative stream.

Collector means 25 has conduits 26 and 27 which provide communication between collector means 25 and heat storage vessels 50 and 60, cycling between the heat storage vessels controlled by valves 71 and 76. Collector means 25 may be a solar collector or may represent a heat exchanger for waste heat.

In operation utilizing solar energy, heat from source 33, the sun, is utilized to raise the temperature of thermal storage material in a vessel such as 50 or 60. Gaseous heat exchange medium is circulated by means of pump 34 via conduit 27 from vessels 50 and 60 up to and through collector means 25 situated on roof 35, and then returned to vessels 50 and 60 at a relatively higher temperature through conduit 26. Pump 34 is operated only during times at which the gaseous heat exchange medium in collector means 25 is at a temperature higher than the temperature of the solid phase thermal storage material in vessels 50 and 60. The hot gaseous heat exchange medium is introduced in the lower portion of the solid phase heat storage and transfer material 51 and allowed to rise upward through the bed of solid material thereby heating it.

Another embodiment is shown in FIG. 3 wherein the regenerative stream of the air conditioner is in indirect thermal exchange with the solid phase thermal storage means. In this embodiment which allows use of other fluids than air, it may be satisfactory, dependent upon size and capacity of the thermal storage means, to utilize one thermal storage means. Multiple thermal storage means may also be used in this embodiment. The embodiment shown in FIG. 3 uses a closed system 114 passing a heat exchange liquid 113 in thermal exchange with the thermal storage means 51 and the regenerative air stream. The thermal storage means is heated in the same manner as described above.

Figure 4:
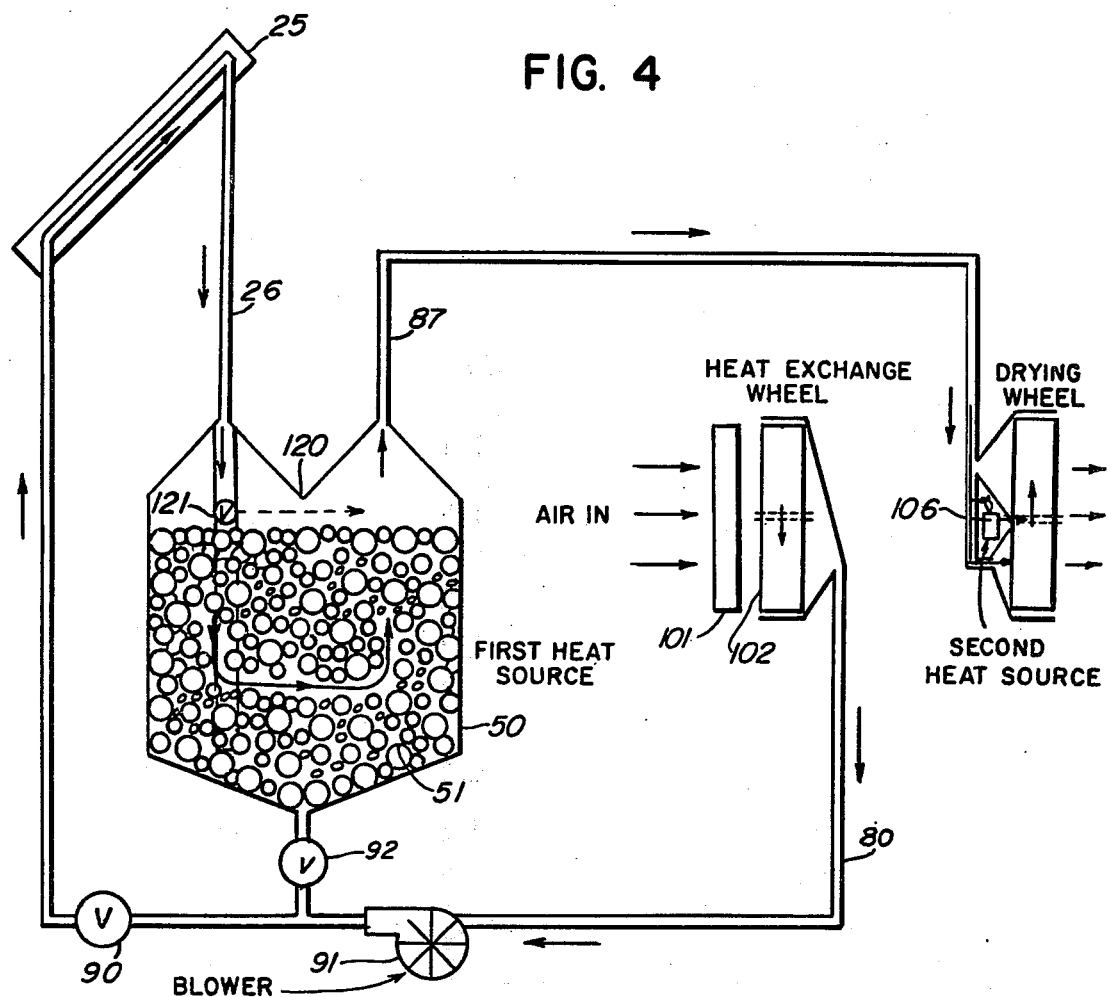
FIG. 4 is a schematic representation of one embodiment of this invention showing use of air as a heat transfer medium from a heat collector.

FIG. 4 schematically shows another embodiment of the apparatus and method of this invention. In this embodiment the regenerative air stream of the air conditioner, after passing the heat exchange means 102, is passed through conduit 80. A portion or all of the air in conduit 80 may be directed to the bottom of the first heat source or heat storage and transfer means 50 or a portion or all of the air in conduit 80 may be directed to heat collector means 25 by control of valves 90 and 92 and blower 91. After being heated in collector means 25, the air stream flows by conduit 26 to the heat storage and transfer means 50. The heat storage and transfer means is not completely filled with thermal storage material 51 and has suitable baffle and conduit means 120 so that a portion or all of the air from conduit 26 may be directed to conduit 87 and returned to the air conditioner without passing over the thermal storage material 51. Suitable baffle and conduit means can also direct by valve 121 a portion or all of the air from conduit 26 to the lower portion of the thermal storage material 51 for heat transfer therewith prior to entering conduit 87 for return to the air conditioner. The relative temperatures of the heat collector means 25 and the thermal storage material govern the desired flow. When the term "first heat source" is used, it includes the heat storage and transfer means and/or the heat collector means.

Figure 5:
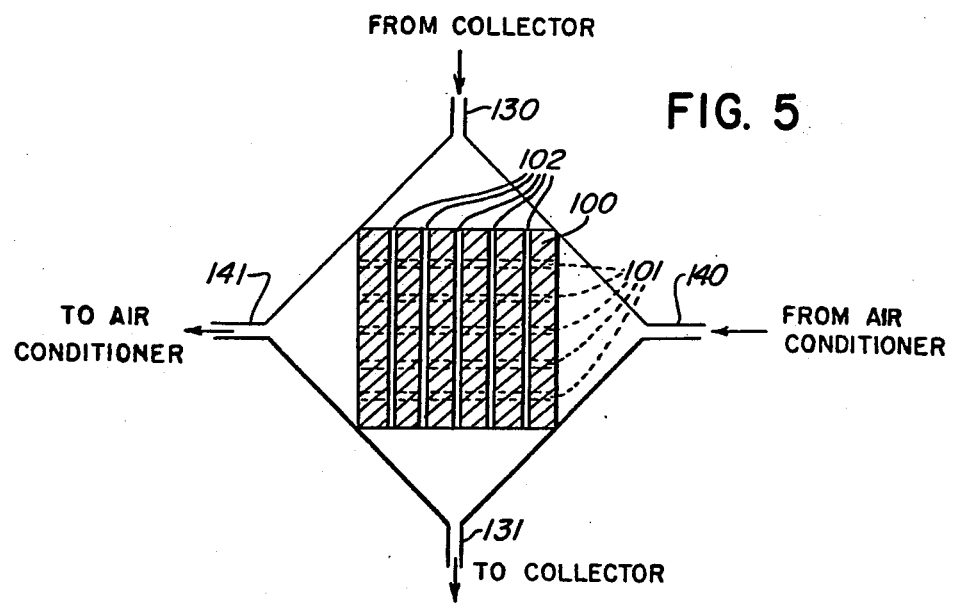
FIG. 5 is a schematic representation showing one embodiment of a cross-flow gaseous heat exchanger for use in this invention.

Another specific embodiment of the heat storage and transfer means is shown schematically in FIG. 5. Thermal storage and transfer mass 100 is a block or structure of suitable thermal storage material more fully described below with passageways 102 therethrough for passage of gas from a heat collector means by conduit 130 and return to collector means by conduit 131 and passageways 101 therethrough for passage of air from the air conditioner by conduit 140 and return to air conditioner by conduit 141. In this embodiment the gas flow stream from the heat collector means is separated from the gas flow stream from the air conditioner and the streams may be in cross-flow or counter-flow relationship. The thermal storage and transfer mass 100 is sufficiently large to act as a storage means in addition to a transfer means. The embodiment shown in FIG. 5 may be readily constructed of suitable precast concrete blocks having desired thermal storage and transfer filler materials and may be substituted for the heat storage and transfer means as shown in other embodiments.

Solid phase thermal storage material suitable for use in this invention includes high thermal capacity solid materials such as metals, both ferrous and non-ferrous, and rock materials such as granite. Commercially available taconite pellets are especially useful. The solid phase material should be of suitable shape and size to furnish required heat storage and transfer capability while minimizing the pressure drop of the gaseous phase passed therethrough. The storage material may conveniently be in a vessel underground with heat loss minimized by means of insulating materials surrounding the vessel.

Solar energy collectors suitable for use in the system embodying the present invention can be of two general types: (1) concentrating type, or (2) non-concentrating type.

The concentrating type solar energy collector is capable of developing higher temperatures by achieving a relatively higher collector efficiency and to achieve a relatively higher collector efficiency by using a smaller heat absorption area with attendant smaller heat losses. However, the concentrating type of collector must use the direct component of sunlight, thus there can be no heat collection on cloudy days. Moreover, if it is desirable that the mirrors and/or lenses follow the direct component of sunlight, they must be guided by a relatively complex and costly tracking system.

The non-concentrating solar collectors collect both the direct and the diffuse components of sunlight, and are operable on cloudy or overcast days as well. They are less costly and no tracking systems are required. Nevertheless, heat transfer gas temperatures of about 230° F. and higher are readily achievable, which temperatures are sufficiently high for the purposes of this invention. A suitable non-concentrating solar collector is shown in FIG. 1.

Collector 25 comprises insulated base 36 on which is placed a sandwich comprising corrugated aluminum plate 36 and flat aluminum plate 40, together defining a plurality of passageways 39 through which a heat transfer gas is circulated. The exposed face 40 of plate 40 may be coated with a selective coating which mainly reduces infrared emission from the collector surface. One or more spaced transparent cover sheets 41 is situated over exposed face of plate 40 to reduce convective heat losses as well as to provide protection from the elements, wind-blown debris, and the like. A polyvinyl fluoride film, glass or the like, reinforced with a wire or fabric mesh is suitable for this purpose.

Any type of solar collector which will raise the temperature of the heat transfer gas to over about 150° to 200° F. is suitable for use in this invention. Likewise, any other heat sources which can provide such temperatures are suitable, such as waste heat from any boiler or chemical process source.

The apparatus and process of this invention can also be operated in a heating mode, providing higher heating efficiency than a conventional gas-fired furnace. In a typical heating mode, the heat exchange wheel 102 is stationary and the rotational speed of the drying wheel 104 is increased to about 2 to about 12 rpm, preferably about 5 to about 7 rpm. At the increased rotational speed this wheel behaves as an enthalpy exchanger, exchanging heat and moisture. The air stream, previously characterized as "treatment air stream" in FIG. 3 heats ambient air by passing through the drying wheel 104, now functioning as an enthalpy exchanger, sufficiently for discharge as conditioned air to the room. The regeneration air stream is heated by the first heat source and a portion by the second heat source 106 to a temperature sufficient to regenerate the enthalpy exchanger both with respect to temperature and moisture. A major portion of the sensible heat imparted to the enthalpy exchanger is removed by the incoming treatment air stream which passes through the heated and regenerated portion of the enthalpy exchanger wheel. In addition, moisture removal from the incoming air stream by the desiccant further raises its temperature. The net effect is that the air stream exhausted from the regeneration air passageway to the ambient atmosphere is at a temperature only about 20° F. higher than ambient. Thus, air stream enthalpy that is being discarded is substantially less than that wasted in the conventional gas-fired furnace where flue gases usually have a temperature of about 400° F. to about 500° F.

An example of the apparatus shown in FIG. 3 in the heating mode is the supplying of conditioned air at about 55 pounds per minute at a temperature of about 163° F., when the ambient temperature is 0° F. and 70,000 BTU/hr. must be supplied to the conditioned volume at a steady state. Room air at about 75° F. is supplied to the regenerative air passageway and heat is supplied to the regenerative air passageway by heat transfer fluid at about 175° F. from a solar energy solid phase thermal storage means at 69.5 pounds per minute, leaving the air stream at about 165° F. The regenerative air stream passing over the first heat source is heated to about 128° F. and further heated by an open flame gas burner used as the second heat source to about 179° F. and then passed through the enthalpy exchanger rotating at about 5 rpm. The heat input to the second heat source, the gas burner, is about 673 BTU/min. The open gas flame adds moisture and if desired, additional moisture may be added by any conventional means such as evaporator pads, prior to introduction to the room. The exhaust air leaving the regenerative air passageway to the ambient atmosphere is about 16° F. The enthalpy exchanger revolves and the incoming treatment air stream at about 0° F. passes through the enthalpy exchanger both heating the stream and drying the stream adiabatically, the combination raising the temperature of the treatment stream to about 163° F. for discharge to the conditioned room. Thus, due to the solar or other first heat source a direct fossil fuel net input of 673 BTU/min. is required while a heat input to the conditioned room of 1167 BTU/min. can be achieved. By contrast, a gas furnace operating at conventional 70% efficiency requires about 1667 for discharge to the conditioned room. Thus, with a direct fossil fuel net input of 673 BTU/min., a heat input to the conditioned room of 1167 BTU/min. can be achieved. By contrast, a gas furnace operating at conventional 70% efficiency requires about 1667 BTU/min. fossil fuel consumption to provide the conditioned room air input of 1167 BTU/min.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An open-cycle air conditioning apparatus for heating and cooling comprising:
   an enclosure defining a treatment air passageway and a separate regenerative air passageway;
   means for passing an air stream through each of said passageways;
   a sensible heat exchanger means for transfer of thermal energy from one of said passageways to the other;
   a desiccant means for transfer of moisture from the air treatment passageway to the regenerative air passageway and spaced toward the exhaust of the regenerative air stream from said heat exchanger means;
   a first evaporative cooling means near the exit of the conditioned air passageway and a second evaporative cooling means near the entrance of the regenerative air passageway;
   a first heater means in the regenerative air passageway between said sensible heat exchanger means and said desiccant means supplying heat to the entire regenerative air stream;
   a second heater means in the regenerative air passageway between said first heater means and said desiccant means supplying regeneration heat to a portion of the regenerative air stream previously heated by said first heater means; and
   a heat collector means and conduit means providing heat to said first heater means.

2. The apparatus of claim 1 having a solid phase thermal storage means from which heat is transferred from said first heater means by a gaseous phase heat exchange medium.

3. The apparatus of claim 2 wherein said solid phase thermal storage means comprises substantially spherical metallic material.

4. The apparatus of claim 2 wherein said solid phase thermal storage means comprises substantially spherical natural rock material.

5. The apparatus of claim 2 wherein said solid phase thermal storage means comprises a structure of thermal storage material having two sets of non-communicating passageways therethrough, the first set of passageways for passage of gaseous phase heat exchange medium from said heat collector and the second set of passageways for passage of air of said regenerative air stream.

6. The apparatus of claim 2 wherein said first heater means comprises a closed cycle system containing a liquid heat exchange medium passing in heat exchange relation through said solid phase thermal storage means transferring heat from said thermal storage means to said regenerative air passageway.

7. The apparatus of claim 2 wherein said regenerative air passageway after passing through said sensible heat exchanger is in communication with said solid phase thermal storage means and said heat collector, valve means proportioning the flow between said thermal storage means and said heat collector.

8. The apparatus of claim 2 wherein said thermal storage means comprise multiple thermal storage vessels and valve means cycling gaseous flow from said heat collector and from said regenerative air stream through solid phase thermal storage material.

9. The apparatus of claim 1 wherein said heat collector is a solar energy collector.

10. The apparatus of claim 2 wherein said regenerative air passageway after passing through said sensible heat exchanger is in communication with said solid phase thermal storage means and from said thermal storage means is in communication with said desiccant means.

11. The apparatus of claim 1 wherein said heat collector means is a heat exchanger for waste heat.

* * * * *